April 24, 1956
T. RIEHM
2,743,219
PROCESS FOR RECOVERY OF HYDROCHLORIC
ACID FROM WOOD SUGAR SOLUTIONS
Filed July 18, 1951
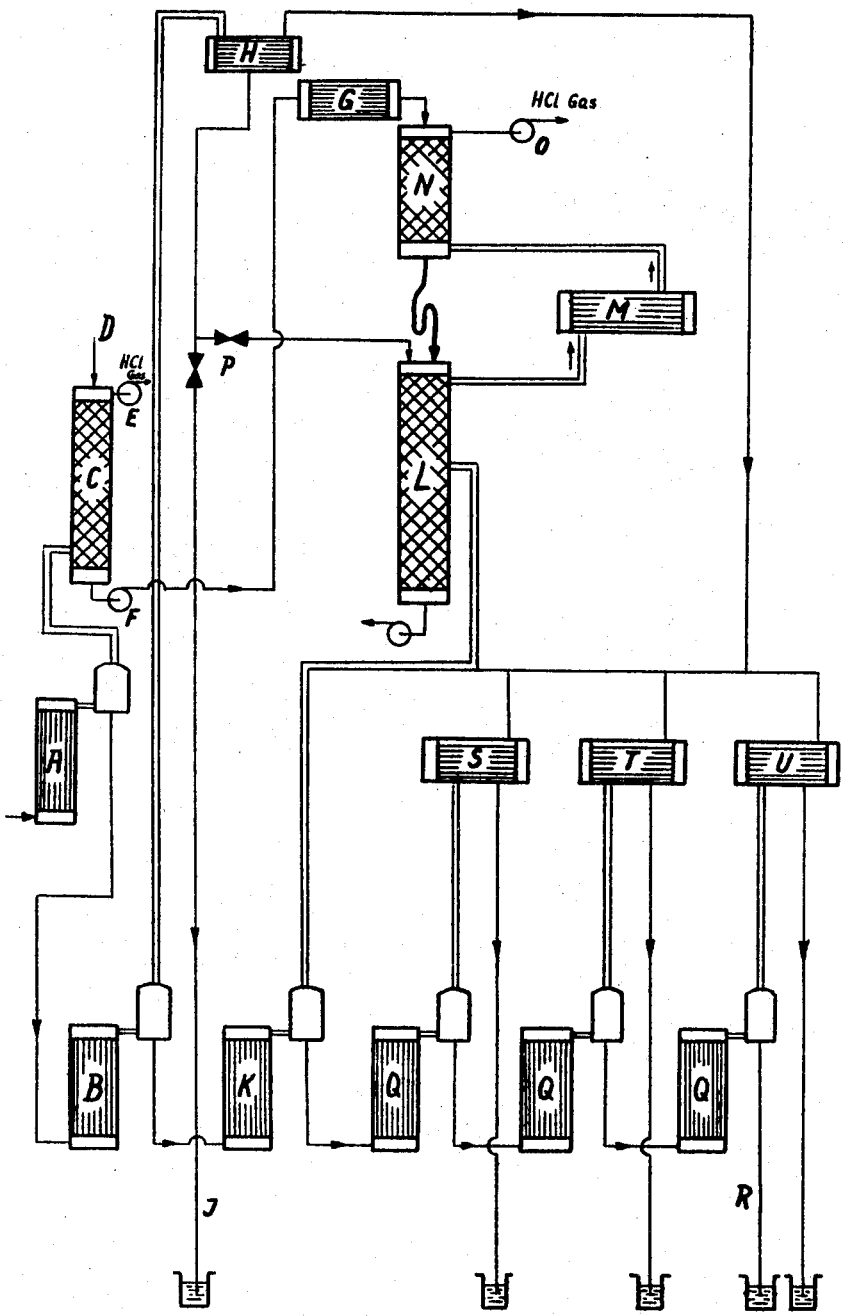
Inventor
Theodor RIEHM
By
*Fritz G. Hochwald*
AGENT

United States Patent Office 2,743,219
Patented Apr. 24, 1956

2,743,219

PROCESS FOR RECOVERY OF HYDROCHLORIC ACID FROM WOOD SUGAR SOLUTIONS

Theodor Riehm, Mannheim-Rheinau, Germany, assignor to Deutsche Bergin-Aktiengesellschaft, Mannheim-Rheinau, Germany Application July 18, 1951, Serial No. 237,322

Claims priority, application Germany March 13, 1950

7 Claims. (Cl. 202—52)

The invention relates to the technically and commercially very important hydrochloric acid economy in wood saccharification plants, and more particularly to the circulation, recovery and utilization of hydrochloric acid and halogen chloride gas in the wood saccharification with highly concentrated hydrochloric acid of about 40% HCl.

Heretobefore, the hydrochloric acid was circulated in three cycles, which will be designated as main cycle I, main cycle II, and side cycle.

In the main cycle I, the hydrochloric acid which in the last stage of the saccharification still adheres to the lignin, is recovered in several diffusors connected in series by displacement and washing with water. The water is fed into the last diffusor, and in the first diffusor an acid is recovered, of which one half consists of an about 40% HCl, directly suitable for re-use, whereas the other half contains, because of the addition of water for displacement and washing, only about 35% HCl; therefore, in order to be used again for the hydrolysis, this acid has to be enriched with halogen chloride gas to about 40% HCl. In this process, the stronger acid of one diffusor is always displaced by the weaker acid of the following diffusor.

The main cycle II deals with the hydrochloric acid-sugar solution produced by the wood hydrolysis; in this cycle, the major part of the hydrochloric acid is removed by vacuum distillation.

The vapors leaving the system are condensed whereby a weak hydrochloric acid of about 10% is added to obtain complete condensation or absorption. The aqueous hydrochloric acid is heated with a drying agent, e. g. calcium chloride, in an evaporator and the halogen chloride gas driven off is used to upgrade the hydrochloric acid of about 35% obtained in the main cycle I.

The remaining calcium chloride solution has to be concentrated for its re-use as drying agent. The halogen chloride containing vapors developed in this concentration are subjected to a fractional condensation. The first condensate, which contains about 10 per cent of HCl, is used for the aforesaid complete condensation or absorption of the vapors generated in the main cycle II by vacuum distillation of the wood sugar solution. The second condensate, which contains only traces of HCl, is to be considered as the removed water introduced before into the hydrochloric acid cycle at other places, e. g. into the washing diffusors.

The sugar solution, which remains in the main cycle II after the vacuum distillation, still contains about 10 per cent of HCl calculated on sugar. This acid is removed by a vacuum distillation with steam, the so-called expulsion of the residual acid, whereby an about 10% HCl is obtained.

According to the present invention, the hydrochloric acid cycle in a wood saccharification plant is so adjusted that a minimum of water is introduced and that dilute acid required for the acid-consuming units such as the preliminary wood hydrolysis and the ion-exchange installations, is drawn off from the acid cycles at such places and in such concentration as to have the dilution degree suitable for the immediate processing.

Therefore, my novel process for the recovery and utilization of hydrochloric acid and halogen chloride from sugar solutions obtained by the hydrolysis of cellulosic material, preferably wood, with e. g. 40 per cent HCl, may be characterized by the following steps, applied in combination or even singly:

(a) The recovery of the hydrochloric acid still adhering to the lignin in the last phase of the saccharification process is carried out in such a way that on the one hand, highly concentrated hydrochloric acid of about 40 per cent is obtained which can be re-used directly for the hydrolysis, and on the other hand, strongly diluted hydrochloric acid of about 1.5 per cent directly suitable for the pre-hydrolysis of the wood.

(b) The expulsion of the residual acid from the wood sugar solution from which the major part of the hydrochloric acid has been removed, is carried out continuously with recovery of separate condensates, e. g. condensates of strong, medium, or weak concentration, and said condensates are put to uses requiring no, or only negligible, dilution.

(c) The vacuum distillation of the acid wood sugar solutions is carried out continuously in such a way that part of the $HCl-H_2O$ vapors is condensed and that the remainder is treated in the vapor phase under vacuum with dehydrating agents.

The above-mentioned process of displacing and washing out the hydrochloric acid adhering to the lignin (main cycle I) was carried out heretofore by displacing the contents of the washing diffusors within a half to one hour and then allowing them to stand for 3 to 4 hours. Therefore, the washing out was carried out at a rate not adjusted to the rate of diffusion of the halogen chloride out of the lignin.

I have found that the lignin absorbs the concentrated hydrochloric acid not only by capillary action like a sponge but that, in addition, a specific absorption of hydrogen chloride takes place, so that, for instance, the acid concentration of about 42 per cent HCl drops to about 39 per cent HCl when dry lignin is impregnated with concentrated hydrochloric acid and the acid is then dripped therefrom. There is a heterogeneous equilibrium between the hydrogen chloride absorbed by the lignin and the hydrochloric acid surrounding the lignin, and the amount of absorbed hydrogen chloride is the smaller, the more diluted the hydrochloric acid surrounding the lignin is. These relations obtain also when hydrochloric acid is washed out of the lignin in a series of diffusors. The lignin has absorbed in the foremost washing diffusor a certain amount of hydrogen chloride, which is given off gradually by diffusion when the highly concentrated acid in said foremost diffusor is displaced by a weaker acid. In this way, an equalization of the concentration and a migration of HCl from the lignin into the hydrochloric acid takes place, which is caused by the fact that the heterogeneous equilibrium is disturbed at each displacement. However, if said displacement is carried out so slowly as to effect the diffusion of the acid out of the lignin substantially at the same rate as the displacement of the stronger acid by the weaker acid, thereby maintaining substantially at all times the heterogeneous equilibrium, substantially no, or only very little, intermixture, i. e. dilution of the hydrochloric acid, takes place.

In accordance with the invention, the recited observations are put to practical use by pumping a uniform stream of water into the last washing diffusor and by controlling the rate of flow so as to maintain substantially the heterogeneous equilibrium referred to hereinabove. I have found that in our plant this aim was attained when the rate of flow was adjusted so that the total content of the diffusor battery was displaced within a period of about 4 hours. Hereby, I obtained the advantage that in the first diffusor exclusively an about 40 per cent, i. e. high concentrated hydrochloric acid is produced, which can be re-used directly for the wood hydrolysis; in other words, the step necessary to concentrate the hydrochloric acid of only about 35 per cent obtained in the conventional process is omitted. According to the invention, strongly diluted hydrochloric acid of about 1.5 per cent is drawn off from one of the last diffusors towards the end of the displacement process, which acid may be used directly for the pre-hydrolysis of the wood. In this way, as much water is removed from the diffusor system as must be added to displace the highest percent acid (of about 40 percent).

Heretofore, an about 10 per cent hydrochloric acid was used for the pre-hydrolysis of wood. This acid was obtained from the liquid remaining after the vacuum evaporation of the wood sugar solution in the so-called expulsion of the residual acid by vacuum distillation with water and diluted by addition of water to the concentration degree of about 1.5 per cent required for the pre-hydrolysis. According to the present invention, the dilution formerly required for the use of the acid in certain sections of the plant, for instance in the pre-hydrolysis, takes place already in the washing diffusors; stated differently, the dilution water required for the pre-hydrolysis assumes, according to the invention, the function of displacing and washing out the hydrochloric acid from the lignin without diluting the concentrated acid in the first diffusor. According to the former practice, dilute acid was always filled into the last washing diffusors, because it was believed that the high-concentrated acid must be displaced by weaker acid; the novel steps of my process are, therefore, by no means obvious.

As mentioned above, the wood sugar solution obtained in the commercial wood saccharification with 40% hydrochloric acid is freed of the main amount of hydrochloric acid by vacuum distillation; the outgoing vapors are, with admixture of weak hydrochloric acid of about 10 per cent, subjected to total condensation. The obtained aqueous hydrochloric acid is heated in a vaporizer with a drying agent, e. g. concentrated calcium chloride solution, and the carried off halogen chloride gas is used to fortify the 35% hydrochloric acid obtained heretofore in the first diffusor besides the 40% hydrochloric acid. As, according to the present invention, the first diffusor yields only 40% hydrochloric acid, the halogen chloride gas obtained by the treatment of the aqueous hydrochloric acid with drying agents may be used for other purposes.

The acid containing vapors obtained by concentrating the calcium chloride solution are, in the known process, subjected to a fractional condensation; the obtained first condensate, which contains about 10% HCl, is used for the aforesaid complete condensation or absorption of the vapors coming from the wood sugar vacuum vaporization, while the second condensate, which contains only traces of HCl, may be considered as sluiced out water.

According to the invention, the residual acid is recovered from the wood sugar solution, after removal of the bulk of the hydrochloric acid, by forming strong, medium and weak condensates, which contain for instance, 23 per cent, 10 per cent, and 2 per cent of HCl, respectively. By mixing, an about 8% hydrochloric acid is obtained which is used for the regeneration of the ion exchanger instead of the about 30% acid used heretofore. The balance of hydrochloric acid remaining after taking off said 8 per cent acid from the total yield of residual acid condensate may be used for other purposes, e. g. for the prehydrolysis of wood.

The recited steps of the invention make it possible to omit entirely the conventional main cycle I and to simplify the main cycle II, so as to render superfluous the removal of water when the consumed and lost hydrochloric acid is replaced by halogen chloride gas, which may be prepared from chlorine and hydrogen.

The new process may be carried out, for instance, by condensing the vapors of the wood sugar vacuum vaporization at as low a temperature as possible, e. g. between 0 and 20° C., thereby producing an about 30 to 35% acid. The not condensable hydrogen chloride gases may be sucked off and used at atmospheric pressure to fortify the about 30 to 35% acid of the condensate to the original concentration of about 40% HCl.

If the amount of consumed hydrogen chloride is to be replaced by aqueous hydrochloric acid of, for instance 30%, this may be done, for instance, by condensing only a portion of the vapors of the wood sugar vacuum vaporization and by recovering the required water amount directly from the residual HCl-H₂O vapors in the gaseous phase under vacuum. This result may be brought about by introducing the vapors into a packed tower which is fed with a dehydrating agent, preferably with concentrated sulphuric acid. In the following, this operation will be designated as vapor dehydration. The remaining hydrogen chloride gases may, as described hereinbefore, be drawn off by suction and used for fortifying the condensed acid.

In order to reduce the compression energy for drawing off the hydrogen chloride, the suction is carried out preferably in two steps. As long as the wood sugar solution is still rich in HCl, it begins to boil at 100 Torr already below 30° C., whereby the vapors consist first almost entirely of pure hydrogen chloride. When, during the distillation, the boiling point has risen, it can be lowered by applying a lower pressure, for instance of 50 Torr and less. Consequently, it is possible to operate with a minimum compression power without risking that the temperature of the sugar solution rises beyond the dangerous temperature (about 50–60° C.) of the beginning sugar decomposition. The idea of dehydrating HCl-H₂O mixtures in vacuo and of controlling the dehydration so as to reach the boiling temperature of the sulphuric acid at about 50 Torr and an about 70% concentration of the effluent sulphuric acid, i. e. of working with a practically boiling sulphuric acid at the bottom of the absorption tower, is contrary to the conventional conceptions. The known methods have been based on the assumption that the dehydration is the more efficient the lower the used temperatures are. The new method has the advantage of oxidizing, and thereby rendering harmless, the impurities contained in the hydrochloric acid of the wood saccharification and of yielding an HCl free effluent sulphuric acid.

The hydrogen chloride gas given off in the dehydration with sulphuric acid must be thoroughly dried to avoid corrosion. According to the invention, the drying can be carried out by scrubbing with concentrated sulphuric acid, but at as low a temperature as possible. Hereby small amounts of hydrogen chloride gas remain dissolved in the sulphuric acid. But as the sulphuric acid diluted with only a small amount of water can be used for scrubbing in the vapor dehydrating column, the hydrogen chloride retained by the sulphuric acid is given off again.

These last described steps of the invention will be explained more in detail with reference to the accompanying drawing, which illustrates schematically, by way of example, an apparatus suitable for carrying out said steps in a continuous operation.

The wood sugar solution is fed into the first vaporizer A. The produced vapors, which consist of almost pure hydrogen chloride, are completely dried in the packed column C by means of an about 95% sulphuric acid introduced at D and flowing in counter-current to the hydrogen chloride. The hydrogen chloride can then be drawn off by an iron vacuum pump E at about 100 Torr and pumped into the hydrochloric acid concentration. Because of the small water content of the hydrogen chloride vapors, the sulphuric acid is only slightly diluted; it is pumped by the pump F through the cooler G to the vapor dehydrating column proper.

The sugar solution flows into the still B. The vapors generated therein are completely condensed in H, whereby in contradistinction to the prior art methods, no water has to be added because the excess of hydrogen chloride obtained in those prior methods has already been drawn off by the pump E. The condensate is drawn off by a barometric down pipe.

Subsequently, the sugar solution goes into the still K. The vapors generated therein contain about 25% of HCl and pass into the lower third of a packed column L scrubbed with sulphuric acid, whereby the bulk of the water is removed. The heat of reaction is carried away in the reflux cooler M to such an extent that the sulphuric acid at the bottom of the column L has approximately boiling temperature. The supply of the sulphuric acid is so adjusted that the concentration of the sulphuric acid leaving the bottom is about 70%. The dehydrated vapors pass through a smaller packed column N, which is scrubbed with concentrated sulphuric acid and serves as an after-drier. The anhydrous hydrogen chloride can now be drawn off by an iron vacuum pump O at about 50 Torr. Said pump produces simultaneously the vacuum for the still B and the still Q.

The 70% sulphuric acid from the packed column L is pumped to a sulphuric acid concentration, and, after concentration, re-circulated to D. Therefore, this about 96% sulphuric acid supplied to the apparatus at D is first used in the packed columns C and D for drying the gases, whereby the acid is only slightly diluted and takes up some hydrogen chloride. Only afterwards it is used in the packed column L for the vapor dehydration proper.

A fine regulation of the water amount to be taken out of the acid cycle in accordance with the operating conditions is obtained by control valves and a transverse conduit at P, which allow of passing more or less condensate from H to the packed column N.

The sugar solution coming from the still K passes through one after the other of the after-vaporizers Q and is eventually drawn off through the barometric down pipe R. The vapors generated in the after-vaporization (expulsion of the residual acid) are condensed in the condensers S, T, and U. I obtain thereby in condenser S an about 23% condensate, in condenser T an about 10 per cent condensate and in condenser U an about 2 per cent condensate; these condensates may be used as such or supplied to the points of consumption in form of mixtures of the required concentration.

The invention allows of completely omitting the main cycle I, as well as the side cycle of the prior art, thereby reducing the amount of acid to be regenerated by more than half. Additional advantages are the savings in power, apparatus, etc.

The economy of the new process with respect to hydrochloric acid evaporation, dehydration and sulphuric acid concentration, compared with the known process of acid evaporation and distillation, is as follows: The heat requirements (calculated as coal), when the consumed and lost hydrochloric acid is replaced by hydrogen chloride gas produced from chlorine and hydrogen, are only 37 per cent of those of the known process; the consumption of electric current is only about 43%, the cooling water only about 38%, the consumption of auxiliary materials only about 30%, and the capital cost of the plant about 66%. When the consumed and lost hydrogen chloride is replaced by aqueous hydrochloric acid of about 30%, the required heat amounts to only 49 per cent and the required electric current to about 78 per cent of those of the known process.

In this description a pressure of 1 Torr equals 1 mm. of mercury equals 0.01934 lb. per sq. inch.

What I claim is:

1. A process for the recovery of about 40% hydrochloric acid from an acid sugar solution produced by the saccharification of lignin-containing cellulosic materials with said acid, which comprises removing from said sugar solution first substantially pure hydrogen chloride gas by a distillation under reduced pressure, and subsequently removing by a second distillation step under reduced pressure 25 to 35% hydrochloric acid vapors, cooling said vapors, thereby obtaining an aqueous 25 to 35% hydrochloric acid, and enriching said hydrochloric acid with said hydrogen chloride gas at atmospheric pressure to the original concentration of about 40%.

2. A process for the recovery of about 40% hydrochloric acid from an acid sugar solution produced by the saccharification of lignin-containing cellulosic materials with said acid, which comprises removing from said sugar solution first substantially pure hydrogen chloride gas by a distillation at a temperature below 50° C. under reduced pressure, subsequently removing by a second distillation step at a temperature below 50° C. and at a pressure lower than the pressure in the first distillation step 25 to 35% hydrochloric acid vapors, cooling said vapors, thereby obtaining an aqueous 25 to 35% hydrochloric acid, and enriching said hydrochloric acid with said hydrogen chloride gas at atmospheric pressure to the original concentration of about 40%.

3. A process for the recovery of about 40% hydrochloric acid from an acid sugar solution produced by the saccharification of lignin-containing cellulosic materials with said acid, which comprises boiling said solution first at a pressure of about 100–150 mm. Hg, thereby distilling off essentially pure hydrogen chloride gas, continuing said distillation until the boiling point of the solution rises, subjecting then said solution to a second distillation step at a pressure of not more than about 50 mm. Hg, thereby removing 25 to 35% hydrochloric acid vapors directly condensable at said pressure, cooling said vapors to form a condensate of 25–35% aqueous hydrochloric acid, and enriching said condensate with said hydrogen chloride gas at atmospheric pressure to the original concentration of about 40%.

4. A process for the recovery of about 40% hydrochloric acid from an acid sugar solution produced by the saccharification of lignin-containing cellulosic materials with said acid, which comprises distilling off from said sugar solution at reduced pressure and at a temperature below the temperature of sugar decomposition in a first step substantially pure hydrogen chloride gas and in a second step about 25 to 35% hydrochloric acid vapors, condensing under said reduced pressure part of said 25 to 35% hydrochloric acid, treating the remaining vapors of said second step under reduced pressure with a dehydrating agent to remove water vapor, subsequently combining said hydrochloric acid vapors with the vapors of the first distillation step and said condensate of the second distillation step, the amount of water vapor removed by said dehydrating agent being so adjusted that the remaining hydrochloric acid vapors have the concentration necessary to reinforce said condensate to an about 40% hydrochloric acid, and recycling said about 40% hydrochloric acid into said acid sugar solution.

5. A process for the recovery of about 40% hydrochloric acid from an acid sugar solution produced by the saccharification of lignin-containing cellulosic materials with said acid, which comprises removing from said sugar solution in a first step substantially pure hydrogen chloride gas by a distillation under reduced pressure, subsequently removing by a second distillation step 25 to 35% hydrochloric acid vapors, condensing part of said vapors to a 25 to 35% hydrochloric acid solution, and treating the uncondensed rest of said vapors with high concentrated sulphuric acid so as to remove part of the water vapor, and enriching said condensate with said uncondensed dehydrated vapors and said hydrogen chloride of the first step at atmospheric pressure to the original about 40% hydrochloric acid concentration.

6. A process for the recovery of about 40% hydrochloric acid from an acid sugar solution produced by the saccharification of lignin-containing cellulosic materials with said acid, which comprises removing from said sugar solution in a first step substantially pure hydrogen chloride gas by a distillation under reduced pressure, subsequently removing by a second distillation step 25 to 35% hydrochloric acid vapors, condensing part of said vapors to a 25 to 35% hydrochloric acid solution, passing the uncondensed rest of said vapors into a scrubbing zone, scrubbing said vapors in countercurrent with an about 95 to 96% sulphuric acid to absorb water vapor, adjusting the temperature of the scrubbing zone and the supply of the sulphuric acid to said zone so as to draw off from the bottom of the scrubbing zone a boiling sulphuric acid of about 70 per cent concentration, and enriching said condensed 25 to 35% hydrochloric acid solution with said uncondensed dehydrated vapors of the second distillation step and hydrogen chloride gas of the first distillation step at atmospheric pressure to the original about 40% hydrochloric acid concentration.

7. A process for the recovery of about 40% hydrochloric acid from an acid sugar solution produced by the saccharification of lignin-containing cellulosic materials with said acid, which comprises removing from said sugar solution in a first step substantially pure hydrogen chloride gas by a distillation under reduced pressure, subsequently removing by a second distillation step 25 to 35% hydrochloric acid vapors, condensing part of said vapors to a 25 to 35% hydrochloric acid solution, drying the hydrogen chloride vapors of the first distillation step with an about 96% sulphuric acid, passing subsequently said sulphuric acid in countercurrent to the uncondensed rest of the 25 to 35% hydrochloric acid vapors of the second distillation step, and enriching said condensed 25 to 35% hydrochloric acid solution with said uncondensed dehydrated vapors of the second distillation step and hydrogen chloride gas of the first distillation step at atmospheric pressure to the original about 40% hydrochloric acid concentration.

References Cited in the file of this patent

UNITED STATES PATENTS

| Number | Name | Date |
|---|---|---|
| 875,558 | Skinner | Dec. 31, 1907 |
| 1,678,819 | Koch | July 31, 1928 |
| 1,865,797 | Shiffler | July 5, 1932 |
| 2,316,633 | Smith | Apr. 13, 1943 |
| 2,321,282 | Comstock | June 8, 1943 |
| 2,351,461 | Smith et al. | June 13, 1944 |
| 2,392,861 | Pernert | Jan. 15, 1946 |
| 2,413,709 | Hoffman | Jan. 7, 1947 |
| 2,437,290 | Bottenberg et al. | Mar. 9, 1948 |
| 2,463,188 | Latchum | Mar. 1, 1949 |
| 2,490,454 | Myers | Dec. 6, 1949 |

FOREIGN PATENTS

| Number | Country | Date |
|---|---|---|
| 307,998 | Great Britain | Mar. 21, 1929 |